US010505715B2

(12) United States Patent
Lowry

(10) Patent No.: US 10,505,715 B2
(45) Date of Patent: Dec. 10, 2019

(54) METHOD AND SYSTEM OF SYNCHRONOUS ENCRYPTION TO RENDER COMPUTER FILES AND MESSAGES IMPERVIOUS TO PATTERN RECOGNITION AND BRUTE FORCE ATTACKS

(71) Applicant: Marpex, Inc., Steubenville, OH (US)

(72) Inventor: Douglas Bradley Lowry, Steubenville, OH (US)

(73) Assignee: MARPEX, INC., Steubenville, OH (US)

( * ) Notice: Subject to any disclaimer, the term of this patent is extended or adjusted under 35 U.S.C. 154(b) by 70 days.

(21) Appl. No.: 15/816,865

(22) Filed: Nov. 17, 2017

(65) Prior Publication Data

US 2019/0158271 A1  May 23, 2019

(51) Int. Cl.
*H04L 9/06* (2006.01)
*H04L 9/00* (2006.01)
*H04L 9/16* (2006.01)
*H04L 9/12* (2006.01)

(52) U.S. Cl.
CPC .......... *H04L 9/0631* (2013.01); *H04L 9/002* (2013.01); *H04L 9/065* (2013.01); *H04L 9/12* (2013.01); *H04L 9/16* (2013.01)

(58) Field of Classification Search
CPC ........ H04L 9/002; H04L 9/0631; H04L 9/065
See application file for complete search history.

(56) References Cited

U.S. PATENT DOCUMENTS

| | | | | | |
|---|---|---|---|---|---|
| 4,751,733 | A | * | 6/1988 | Delayaye | H04L 9/0631 380/264 |
| 6,078,667 | A | * | 6/2000 | Johnson | G06F 7/582 380/44 |
| 6,185,304 | B1 | * | 2/2001 | Coppersmith | H04L 9/002 380/259 |
| 2004/0165721 | A1 | * | 8/2004 | Sano | H04L 9/002 380/28 |
| 2004/0247116 | A1 | * | 12/2004 | Boren | H04L 9/0662 380/37 |
| 2008/0123848 | A1 | * | 5/2008 | Qiu | H04N 1/44 380/245 |
| 2008/0144079 | A1 | * | 6/2008 | Pandey | G06F 16/90 358/1.15 |
| 2014/0380037 | A1 | * | 12/2014 | Matsuda | H04L 9/0618 713/150 |
| 2016/0379014 | A1 | * | 12/2016 | Satpathy | G06F 21/74 713/189 |

* cited by examiner

*Primary Examiner* — Daniel B Potratz
(74) *Attorney, Agent, or Firm* — Carlson, Gaskey & Olds, P.C.

(57) ABSTRACT

An example method of cryptographically modifying an input data segment includes performing, in a first stage, a first bit substitution operation based on a first stage input segment and a first cryptographic key sequence. The method also includes performing, in a subsequent second stage, a bit dispersal based on a second stage input segment and a second cryptographic key sequence. The method also includes performing, in a subsequent third stage, a second bit substitution operation based on a third stage input segment and a third cryptographic key sequence. The first, second, and third stage input segments are all derived from the input data segment.

36 Claims, 3 Drawing Sheets

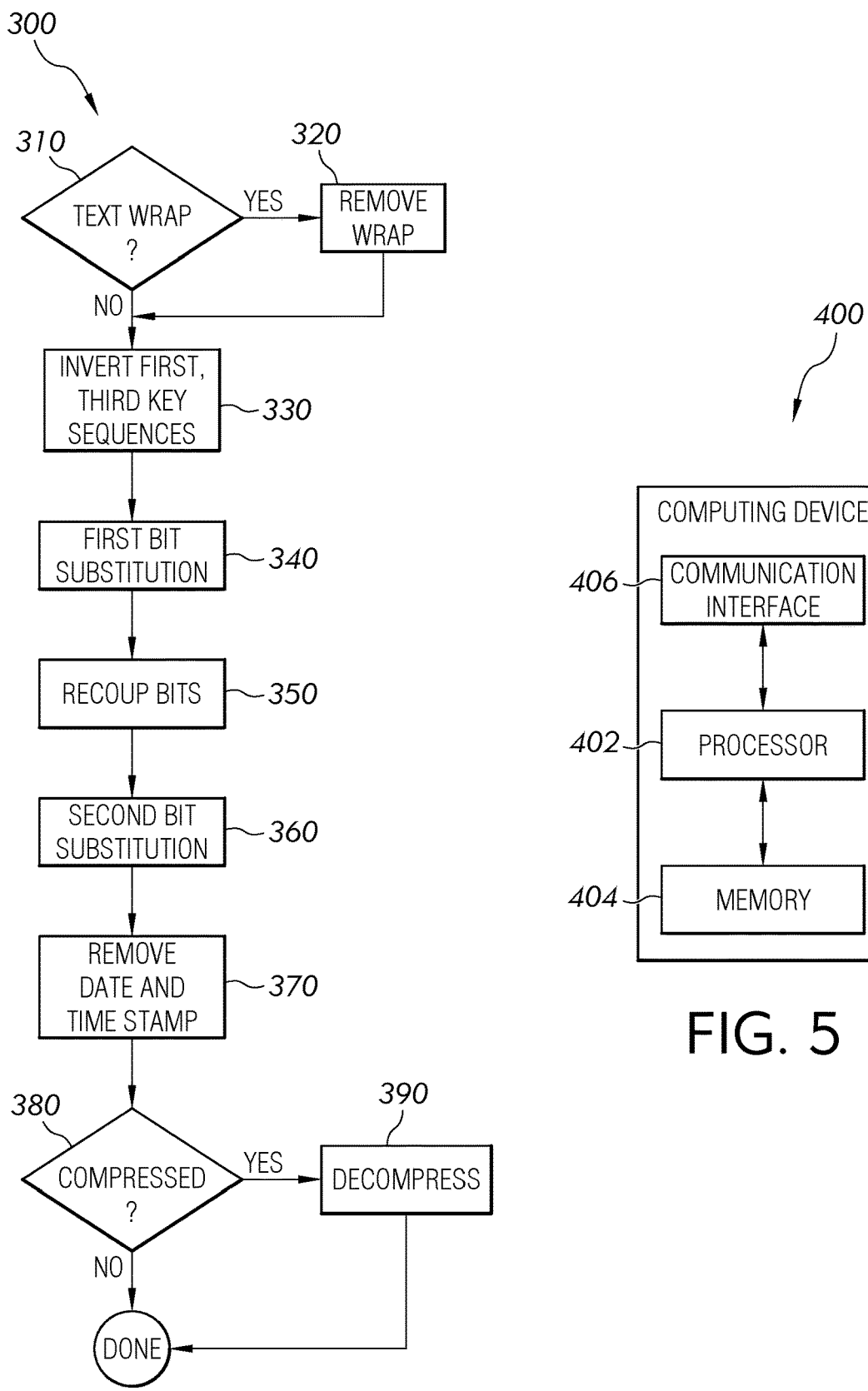

METHOD AND SYSTEM OF SYNCHRONOUS
ENCRYPTION TO RENDER COMPUTER
FILES AND MESSAGES IMPERVIOUS TO
PATTERN RECOGNITION AND BRUTE
FORCE ATTACKS

BACKGROUND

The present disclosure relates to encryption, and more particularly to a method and system of encrypting and decrypting digital data, designed to thwart attacks by hackers using either classical or quantum computing equipment.

Cryptography exists to meet a privacy need, essential for the well-being of individuals, organizations, and governments. The best cryptography in place today appears to fail too often in protecting privacy at any level of society. Public concern has risen steadily over the past two decades amidst news reports of massive breaches of privacy by hackers. Identity theft with attendant personal financial harm, theft of corporate trade secrets, rogue ransom and extortion attacks, and embarrassment for government entities have become all too common.

Hackers are individuals or groups that attempt to gain access to records and communications for which the hacker is not an intended recipient. The outcome of successful hacking ranges from inconvenient to intensely threatening to custodians of records or to persons communicating. Hackers can include relatively novice users utilizing off-the-shelf malevolent software created by others, sophisticated criminal gangs, and even sophisticated nation-state governments. Hacking is a growth industry at every level.

Existing private key/public key encryption systems are under threat from the rise of quantum computing. A fundamentally different method of encryption is needed to withstand quantum computing's twin attack method—algorithmic assault on patterns to eliminate paths to wrong answers combined with extremely robust brute force capability.

SUMMARY

An example method of cryptographically modifying an input data segment includes performing, in a first stage, a first bit substitution operation based on a first stage input segment and a first cryptographic key sequence. The method also includes performing, in a subsequent second stage, a bit dispersal based on a second stage input segment and a second cryptographic key sequence. The method also includes performing, in a subsequent third stage, a second bit substitution operation based on a third stage input segment and a third cryptographic key sequence. The first, second, and third stage input segments are all derived from the input data segment.

An example computing device includes memory storing first, second, and third cryptographic key sequences that are different from each other, and an input data segment. The computing device also includes a processor operatively connected to the memory and configured to, as part of a cryptographic modification of the input data segment: perform, in a first stage, a first bit substitution operation based on a first stage input segment and a first cryptographic key sequence; perform, in a subsequent second stage, a bit dispersal based on a second stage input segment and a second cryptographic key sequence; and perform, in a subsequent third stage, a second bit substitution operation based on a third stage input segment and a third cryptographic key sequence. The first, second, and third stage input segments are all derived from the input data segment.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible

BRIEF DESCRIPTION OF THE DRAWINGS

FIG. 4 is a flowchart of an example method of decrypting an input data segment.
FIG. 5 schematically illustrates an example computing device.

DETAILED DESCRIPTION

Figure 1:
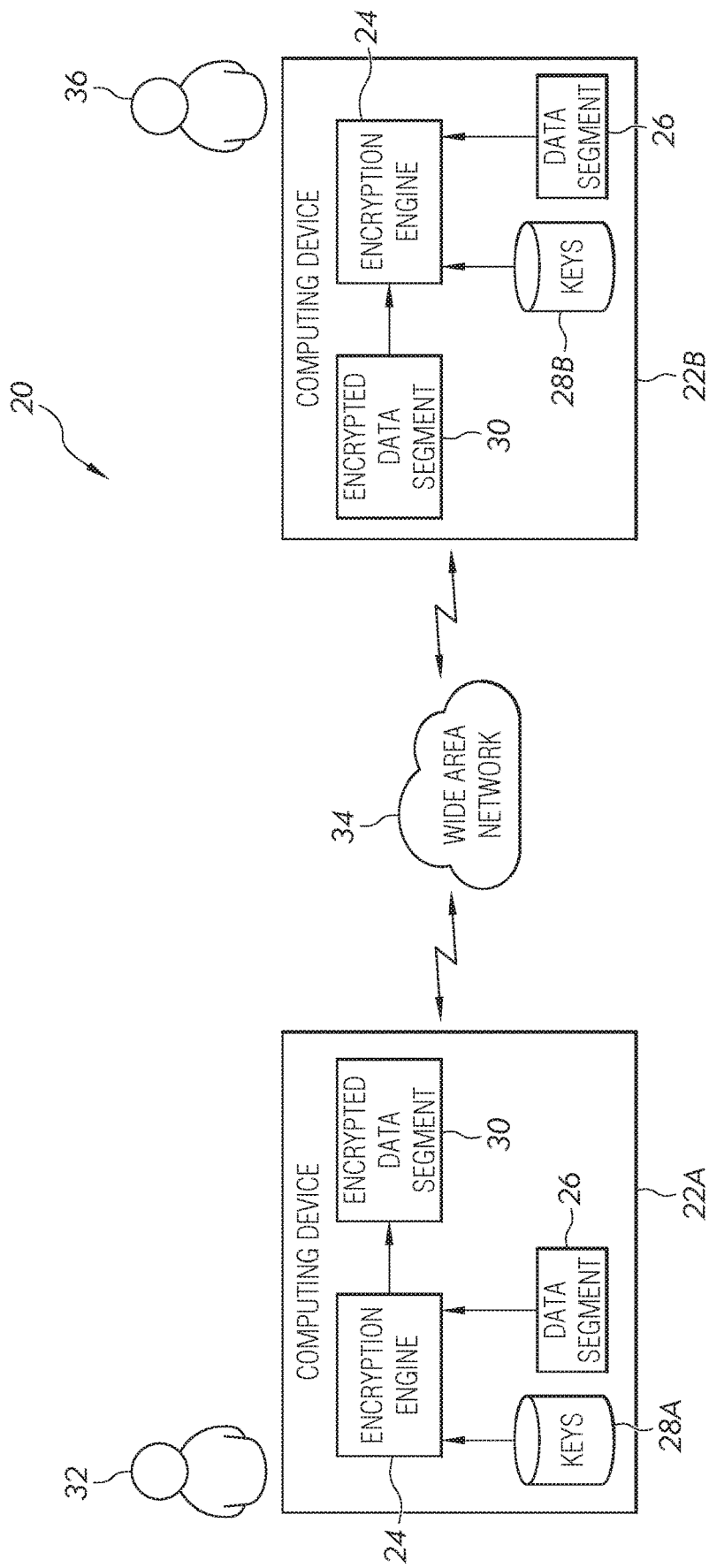
FIG. 1 schematically illustrates an example encryption system.

FIG. 1 schematically illustrates an example synchronous encryption system 20 that includes a first computing device 22A and a second computing device 22B that have access to shared cryptographic keys in their respective key repositories 28A, 28B. The first computing device 22A includes an encryption engine 24A configured to encrypt an input data segment 26 using a cryptographic key stored in key repository 28 to obtain an encrypted data segment 30.

The first computing device 22A transmits the encrypted data segment 30 to the second computing device 22B over a wide area network 34 (WAN), such as the Internet. The computing device 22B also includes a copy of the encryption engine 24, which utilizes the same cryptographic key stored in key repository 28B to decrypt the encrypted data segment 30 and provide the initial input data segment 26.

Optionally, the users 32, 36 may aid their respective computing device 22A-B in performing the encryption and/or decryption, such as by identifying the input data segment 26 to be encrypted (user 32) or identifying the encrypted data segment 30 to be decrypted, and/or by identifying the appropriate cryptographic key to be used.

The encryption engine 24 is configured to perform a series of cryptographic modifications on the input data segment 26 to produce the encrypted data segment 30 and decrypted data segment 26. The series of cryptographic modifications involves a bit substitution followed by a bit dispersion, followed by another bit substitution, which dramatically reduces any patterns that may have been present in the original input data segment 26. More detail is provided in connection with FIG. 2.

In one example, a "successive factorial key" is used that includes three discrete cryptographic key sequences, one for each stage described above, with each sequence including a unique sequence of non-repeated integers. More detail about key creation is provided in connection with FIG. 3.

Figure 2:
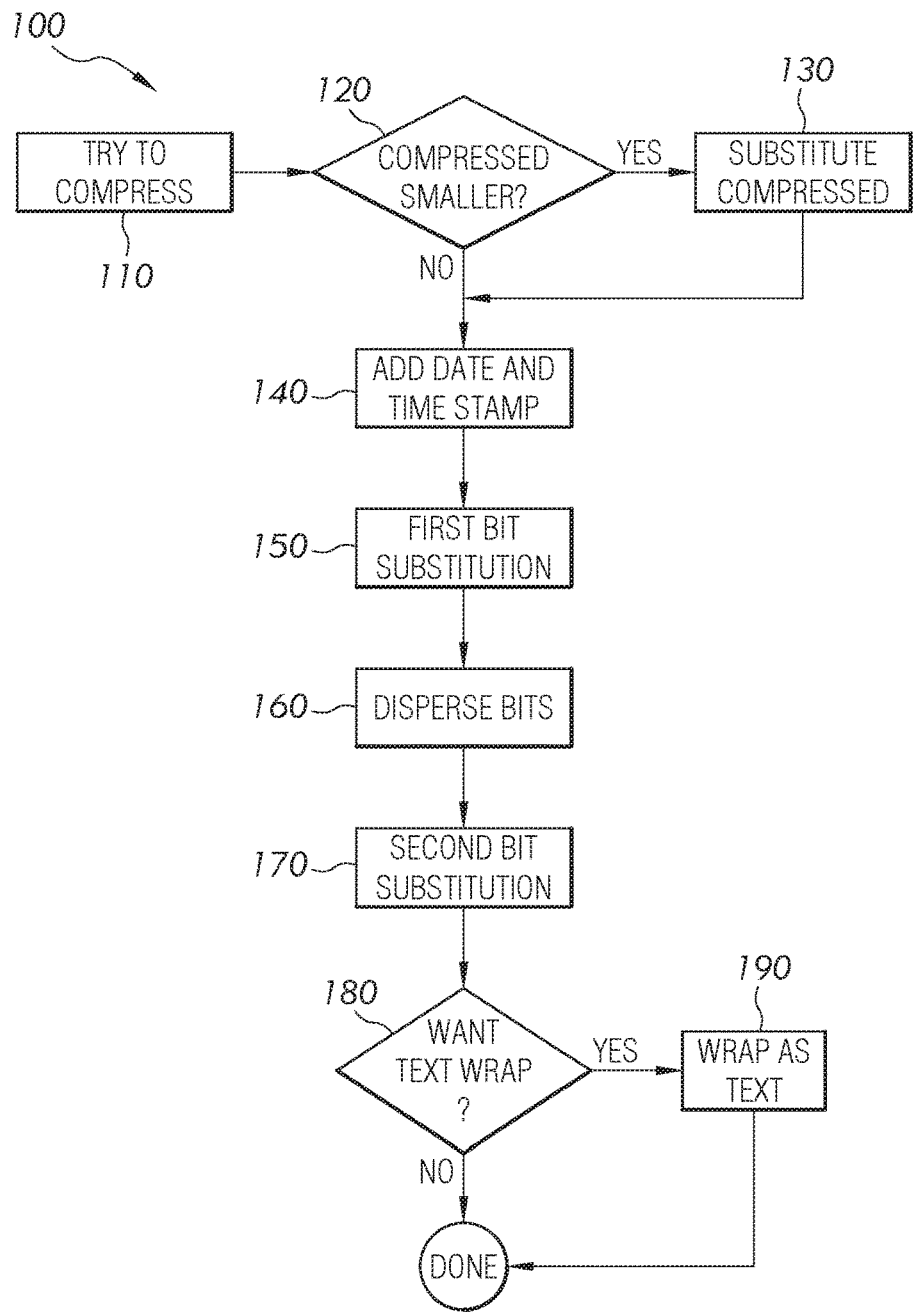
FIG. 2 is a flowchart of an example method of encrypting an input data segment.

Referring now to FIG. 2, a flowchart of an example method 100 of encrypting input data segment 26 is shown that may be implemented by the encryption engine 24. The computing device 22A attempts to compress the input data segment 26 (step 110), and determines if the compressed version of the input data segment 26 has achieved a threshold size reduction (step 120). In one example, the threshold is defined as a percentage of the original file size (e.g., 5% or 10%). If the threshold size reduction is achieved (a "yes" to step 120), the computing device 26 utilizes the compressed version of the input data segment 26 by substituting it for the original input data segment 26 (step 130). Otherwise, if the threshold size reduction is not achieved (a "no" to step 120), the uncompressed input data segment 26 is used. A date and time stamp is added to the input data segment (step 140).

The input data segment 26 is then cryptographically modified using a plurality of cryptographic key sequences. In one example, the cryptographic key sequences are all different from each other and are part of a larger cryptographic key. A further discussion of the cryptographic key is discussed in connection with FIG. 3 below.

Referring again to FIG. 2, a first bit substitution is performed based on a first cryptographic key sequence (step 150). A bit dispersal is then performed using a second cryptographic key sequence (step 160). A second bit substitution is then performed using a second cryptographic key sequence (step 170), which yields the encrypted data segment 30.

A determination is then made of whether the encrypted data segment 30 is to be text-wrapped (step 180). If so, the encrypted data segment 30 is text-wrapped to decrease the likelihood that the encrypted data segment 30 will be flagged by a spam filter.

Although shown as part of the method 100, steps 110-140 and 180-190 are optional and may be omitted in some embodiments. Also, if desired, some or all of the steps 150-170 could be repeated after step 170 using different cryptographic key sequences.

Patterns are naturally present in many files, due in part to language patterns, such as repeated words. The method 100 significantly reduces patterns in the input data segment 26, which makes it harder for a hacker to decrypt the encrypted data segment 30 without having the cryptographic key sequence used in the steps 150-170 (e.g., by using a brute force attack).

The method 100 will now be discussed in greater detail.

Let N be an integer greater than 2. N is a "key basis" and will appear in the discussion below. N relates to the strength of encryption, with higher values of N indicating stronger encryption. N is also a count of bits that are handled together.

The input data segment 26 could include complete files, complete messages, or a subset of a file. In one example, if files are subdivided into blocks, the length of every block except the last should be the same uniform multiple of K bytes. This restriction eliminates end condition errors in encryption and decryption. The word "block" will be used below to generically refer to the input data segment 26.

Steps 150-170 are discussed below through processing of a small fragment of ASCII text. The 205 byte block is shown in Table 1. It uses another language (German) and includes accented characters to emphasize that the present disclosure is not restricted to encrypting English text, rather any file whatsoever that is based on 8 bit bytes can be cryptographically modified using the method 100.

Each line of 16 characters is followed by the ASCII hexadecimal equivalents. Three characters do not show: 0x20 is a space, 0x0d is a carriage return, and 0x0a is a linefeed.

TABLE 1

Accented ASCII text fragment with hexadecimal equivalents

| D  | e  | r  |    | H  | E  | R  | R  |    | i  | s  | t  |    | m  | e  | i  |
|----|----|----|----|----|----|----|----|----|----|----|----|----|----|----|----|
| 44 | 65 | 72 | 20 | 48 | 45 | 52 | 52 | 20 | 69 | 73 | 74 | 20 | 6d | 65 | 69 |
| n  |    | H  | i  | r  | t  | e  | ;  |    | m  | i  | r  |    | w  | i  | r  |
| 6e | 20 | 48 | 69 | 72 | 74 | 65 | 3b | 20 | 6d | 69 | 72 | 20 | 77 | 69 | 72 |
| d  |    | n  | i  | c  | h  | t  | s  |    | m  | a  | n  | g  | e  | l  | n  |
| 64 | 20 | 6e | 69 | 63 | 68 | 74 | 73 | 20 | 6d | 61 | 6e | 67 | 65 | 6c | 6e |
| .  |    | E  | r  |    | w  | e  | i  |    | d  | e  | t  |    | m  | i  | c  |
| 2e | 0d | 0a | 45 | 72 | 20 | 77 | 65 | 69 | 64 | 65 | 74 | 20 | 6d | 69 | 63 |
| h  |    | a  | u  | f  |    | g  | ü  |    | n  | e  | r  |    | A  | u  | e  |
| 68 | 20 | 61 | 75 | 66 | 20 | 67 | 81 | 72 | 6e | 65 | 72 | 20 | 41 | 75 | 65 |
|    | u  | n  | d  |    | f  | ü  | h  | r  | e  | t  |    | m  | i  | c  | h  |
| 20 | 75 | 6e | 64 | 20 | 66 | 81 | 68 | 72 | 65 | 74 | 20 | 6d | 69 | 63 | 68 |
|    | z  | u  | m  |    | f  | r  | i  | s  | c  | h  | e  | n  |    | W  | a  |
| 20 | 7a | 75 | 6d | 20 | 66 | 72 | 69 | 73 | 63 | 68 | 65 | 6e | 20 | 57 | 61 |
| s  | s  | e  | r  | .  |    | E  | r  |    | e  | r  | q  | u  | i  | c  |    |
| 73 | 73 | 65 | 72 | 2e | 0d | 0a | 45 | 72 | 20 | 65 | 72 | 71 | 75 | 69 | 63 |
| k  | e  | t  |    | m  | e  | i  | n  | e  |    | S  | e  | e  | l  | e  | ;  |
| 6b | 65 | 74 | 20 | 6d | 65 | 69 | 6e | 65 | 20 | 53 | 65 | 65 | 6c | 65 | 3b |
|    | e  | r  |    | f  | ü  | h  | r  | e  | t  |    | m  | i  | c  | h  |    |
| 20 | 65 | 72 | 20 | 66 | 81 | 68 | 72 | 65 | 74 | 20 | 6d | 69 | 63 | 68 | 20 |
| a  | u  | f  |    | r  | e  | c  | h  | t  | e  | r  |    | S  | t  | r  | a  |
| 61 | 75 | 66 | 20 | 72 | 65 | 63 | 68 | 74 | 65 | 72 | 20 | 53 | 74 | 72 | 61 |
| ß  | e  |    | u  | m  |    | s  | e  | i  | n  | e  | s  |    | N  | a  | m  |
| e1 | 65 | 20 | 75 | 6d | 20 | 73 | 65 | 69 | 6e | 65 | 73 | 20 | 4e | 61 | 6d |
| e  | n  | s  |    | w  | i  | l  | l  | e  | n  | .  |    |    |    |    |    |
| 65 | 6e | 73 | 20 | 77 | 69 | 6c | 6c | 65 | 6e | 2e | 0d | 0a |    |    |    |

Patterns are few in small samples, such as the one above. The longest pattern above is "et mich", eight bytes that occur three times. The byte distribution is highly skewed (far from random). Seventeen ASCII bytes comprise over eighty percent of the 205 bytes. In declining frequency, they are: 32 spaces, 27 of the letter e, 17 r, 15 i, 11 n, 10 m, 9 t, 8 h, 8 s, 7 u, 7 c, 6 a, 5 f, 4 l. All remaining characters occur three times or less.

A determination is made of whether the attempted compression yields a threshold size reduction (steps 110-120). The first step is to try to compress the content of a block (step 110). Compression reduces patterns significantly, eliminating many patterns and reducing the length of others. For example, the word substitution method in U.S. Pat. No. 7,433,893 reduces the frequency of each word to one, then supplies pattern-free compressed positions information in lieu of repetitions of words. Many compression systems have the desired effect of preliminary pattern reduction. One non-limiting example of a compression algorithm that could be utilized is the zlib compression library which was authored by Mark Adler and Jean-loup Gailly. It worked well on blocks of up to 100,000,000 bytes, for example. Of course, other compression algorithms could be used, and compression could be omitted altogether if desired.

Table 2 shows the text sample of Table 1 after compression, now 154 bytes in length instead of 205 bytes. Note: this and the following tables all show hexadecimal values of characters/bytes.

TABLE 2

Text fragment after zlib compression (hexadecimal chars)

| 78 | 9c | 4d | 8e | 31 | 0a | c2 | 40 | 10 | 45 | 7b | c1 | 3b | fc | 13 | 78 |
|---|---|---|---|---|---|---|---|---|---|---|---|---|---|---|---|
| 01 | 2b | c1 | 40 | 2a | 8b | a4 | b0 | 5e | 92 | 9f | 64 | 70 | 77 | c0 | d9 |
| 5d | 04 | bb | 1c | d5 | 9b | 38 | 21 | 08 | b6 | f3 | e6 | bf | ff | af | 34 |
| b4 | 4d | d7 | 41 | 72 | 41 | a2 | 28 | 5a | b1 | c2 | 33 | 92 | 18 | 5e | 62 |
| 23 | 54 | 86 | a5 | 64 | a4 | a0 | 33 | a3 | 9e | 8e | 87 | c6 | 01 | 65 | a4 |
| ff | 3b | 42 | a8 | 13 | 66 | 5b | d5 | 45 | 97 | 4a | 54 | 1d | 31 | ad | 8b |
| fd | f0 | bb | 26 | 4c | 26 | 79 | 58 | a8 | b8 | 87 | 9c | 69 | bb | 83 | f6 |
| ac | 32 | 3c | b8 | d7 | 12 | 3d | 19 | bd | d7 | 35 | ff | f1 | cd | 6e | f4 |
| 05 | 7e | ef | 8b | 85 | 8f | 37 | 24 | e4 | 2d | 91 | 71 | 0b | 89 | 9a | 7d |
| 66 | 8c | dc | 96 | 7d | 01 | d2 | 01 | 48 | 56 | | | | | | |
| [Added below in step 140:] | | | | | | | | | | 40 | 96 | 61 | d9 | 59 | |

If the length of content after compression achieves the threshold size reduction (a "yes" to step 120), the compressed content is substituted for the original (step 130).

Since the Table 2 content is 154 instead of 205 bytes, the earlier version is set aside.

Some examples, such as high speed streaming applications (for example, audio signals) may omit entirely the compression steps 110, 120, and 130.

In some applications it may be advantageous to include (e.g., at the end of the final block only) a date/time stamp (step 140), e.g., one that is four bytes. This could be used to compare time of encryption with the latest roster of authorized users, so that the encryption engine 24 (for example) may warn of, or embargo, input from a recently fired employee. Other possible additions: a one byte signal that the content has been compressed, and null padding to ensure accurate encryption/decryption of the last few bytes. In one example, null padding is at most N−1 bytes, but is less for non-prime values of N. For example, null padding is not needed for N=4 or 8. For N=3 or 6, padding is added to make the file length a multiple of 3.

In our example, we shall use N=6 and append at the block end the compression signal 0x40 followed by date/time stamp 0x96 0x61 0xd9 0x59. Note that this brings the length to 159 bytes which happens to be a multiple of three bytes. The last line of Table 2 becomes:

66 8c dc 96 7d 01 d2 01 48 56 40 96 61 d9 59

The block is now ready for the encryption of steps 150-170.

In the example discussed below, a key bit basis of N=6 encryption is used in each of steps 150, 160, and 170 by a sequence of 64 six bit integers. Table 3 shows the three cryptographic key sequences that happen to be used with this example. Each cryptographic key sequence starts out compressed (packed) in 48 bytes, as in Table 3.

TABLE 3

Three sequences to guide encryption - compressed

| 1st key sequence: | f5 | 5f | 87 | b6 | 04 | d9 | 0f | 33 | 86 | 02 | 24 | 52 | 41 | fd | 82 | 06 |
|---|---|---|---|---|---|---|---|---|---|---|---|---|---|---|---|---|
| | 53 | c5 | 5e | 97 | 0a | 62 | a5 | 24 | bb | 53 | 3f | c2 | 7e | de | bf | 76 |
| | b4 | 8f | 9b | 04 | 37 | af | 21 | 24 | b6 | e6 | 21 | da | d6 | cb | 8a | 31 |
| 2nd key sequence: | 75 | eb | 26 | fb | d4 | b8 | 08 | c5 | d9 | 29 | be | 8f | ac | eb | fb | 71 |
| | fc | c0 | 05 | 49 | 68 | 37 | 28 | 87 | 54 | 5b | 7f | 40 | 88 | e7 | 68 | 3d |
| | 96 | 13 | 5c | 11 | c6 | 4e | 49 | 1a | 06 | 13 | de | 9d | 0b | bb | ca | a1 |
| 3rd key sequence: | a3 | 61 | ba | 8c | ea | 89 | e1 | 17 | 3d | 14 | d0 | 1b | bf | ed | 03 | 95 |
| | 20 | 5a | 3f | 07 | b2 | 63 | b5 | 0b | b4 | ad | dd | 9b | fc | fc | 87 | 50 |
| | b1 | 7e | 48 | 0c | 21 | 61 | e7 | 4d | 7a | c4 | ba | 94 | 2c | 89 | 56 | 79 |

The three cryptographic key sequences are expanded to create Table 4 in which each sequence of 48 bytes has been reworked into 64 six bit integers. The expansion uses as input three bytes at a time from Table 3. Consider the first three bytes above, 0xf5 0x5f 0x87. In binary bit format, these three numbers are 11110101 01011111 10000111.

Segregate these bits into successive 6 bit groups:

111101 010101 111110 000111.

In hexadecimal, the preceding line is equivalent to 0x3d 0x15 0x3e 0x07. These in turn are the first four numbers in Table 4. The same process is applied to each 3 bytes of Table 3 input (range 0 to 255) to create four bytes of Table 4 output (each 0 to 63).

TABLE 4

Three sequences to guide encryption - expanded to six bit integers

| | | | | | | | | | | | | | | | |
|---|---|---|---|---|---|---|---|---|---|---|---|---|---|---|---|
| 1st key sequence: | 3d | 15 | 3e | 07 | 2d | 20 | 13 | 19 | 03 | 33 | 0e | 06 | 00 | 22 | 11 | 12 |
| | 10 | 1f | 36 | 02 | 01 | 25 | 0f | 05 | 17 | 29 | 1c | 0a | 18 | 2a | 14 | 24 |
| | 2e | 35 | 0c | 3f | 30 | 27 | 3b | 1e | 2f | 37 | 1a | 34 | 23 | 39 | 2c | 04 |
| | 0d | 3a | 3c | 21 | 09 | 0b | 1b | 26 | 08 | 1d | 2b | 16 | 32 | 38 | 28 | 31 |
| 2nd key sequence: | 1d | 1e | 2c | 26 | 3e | 3d | 12 | 38 | 02 | 0c | 17 | 19 | 0a | 1b | 3a | 0f |
| | 2b | 0e | 2f | 3b | 1c | 1f | 33 | 00 | 01 | 14 | 25 | 28 | 0d | 32 | 22 | 07 |
| | 15 | 05 | 2d | 3f | 10 | 08 | 23 | 27 | 1a | 03 | 36 | 16 | 04 | 35 | 30 | 11 |
| | 31 | 24 | 39 | 09 | 06 | 20 | 18 | 13 | 37 | 29 | 34 | 0b | 2e | 3c | 2a | 21 |
| 3rd key sequence: | 28 | 36 | 06 | 3a | 23 | 0e | 2a | 09 | 38 | 11 | 1c | 3d | 05 | 0d | 00 | 1b |
| | 2f | 3e | 34 | 03 | 25 | 12 | 01 | 1a | 0f | 30 | 1e | 32 | 18 | 3b | 14 | 0b |
| | 2d | 0a | 37 | 1d | 26 | 3f | 33 | 3c | 21 | 35 | 02 | 31 | 1f | 24 | 20 | 0c |
| | 08 | 16 | 07 | 27 | 13 | 17 | 2b | 04 | 2e | 29 | 10 | 2c | 22 | 15 | 19 | 39 |

This packing and unpacking of the cryptographic key sequences reduces file size and obscures the cryptographic key sequences. Tables 3 and 4 present exactly the same three bit sequences, first as 3 times 48 bytes, then as 3 times 64 bytes. Note in passing in Table 4 that no value appears more than once in each sequence.

In this example of "unpacking," the cryptographic key sequences are obtained as 8-bit integers and are segmented into N-bit integers, and with N being 6. M is the first multiple of 8 that is greater than or equal to N. Thus, if N were 10, M would be 16.

The first bit substitution of step 150 is then performed. In one example, the first bit substitution of step 150 includes dividing the input data segment 26 into a plurality of N-bit integers, and for each N-bit integer having a respective value X, replace the N-bit integer with an Xth N-bit integer in the first cryptographic key sequence. In this regard, bit patterns are substituted. This stage is guided by the first sequence of 64 integers in Table 4 and applied to the input in Table 2 above. Consider the first three bytes of input from Table 2, which are 0x78 0x9c 0x4d. In bits, these values are 01111000 10011100 01001101.

Perform "unpacking" to rework these into six bit fragments (N-bit integers)

011110 001001 110001 001101, whose hexadecimal and decimal equivalents are 0x 1e (30), 0x09 (9), 0x31 (49), and 0x0d (13). Thus, X is 30 for the first integer, 9 for the second integer, 49 for the third integer, and 13 for the fourth integer. These four values are used to focus on the 30th, 9th, 49th, and 13th elements in Table 4.

To substitute for these fragments, replace the first six bits with the 30th element of Table 4, sequence 1, the next six bits with the 9th element, the third six bits with the 49th element and the fourth six bits with the 13th element, counting from zero instead of from 1. The substitutes are, respectively, 0x14, 0x33, 0x3a, and 0x22. In bits, these values are 010100 110011 111010 100010.

Realign into three 8 bit bytes:

p1 01010011 (0x53), 00111110 (0x3e), 10100010 (0xa2)

which are the first three bytes of Table 5 below.

Repeat the substitution across all bytes in the block. Table 5 shows the result on the 159 bytes in the compressed version of German text:

TABLE 5

Input data segment after initial bit substitution (step 150)

| 53 | 3e | a2 | ff | fb | 4e | 37 | 0f | 50 | 7c | 51 | 15 | 47 | 13 | 42 | 53 |
|---|---|---|---|---|---|---|---|---|---|---|---|---|---|---|---|
| db | 74 | 34 | 1f | 5a | 32 | bd | 8d | 17 | 73 | a4 | a5 | 95 | 66 | 36 | 29 |
| ea | 54 | 68 | d8 | 2e | 98 | c8 | 0d | 03 | 1b | ca | 87 | 31 | c6 | bc | 89 |
| e6 | d9 | 85 | 40 | 5c | d5 | bc | cd | 5c | 8d | 80 | e1 | c3 | 5d | 54 | 5c |
| c8 | 81 | d5 | a9 | 70 | dc | ef | 61 | bd | da | d1 | d7 | 25 | d5 | a5 | c0 |
| b1 | 44 | 93 | af | b5 | ba | 4a | 2c | 13 | c5 | da | 74 | 2a | 01 | c6 | c6 |
| c6 | 4f | 96 | cf | 03 | 7b | 52 | 53 | 2f | b0 | 35 | 18 | 70 | ab | 07 | e1 |
| a3 | 7c | 48 | 6f | c5 | b7 | f2 | 69 | 12 | a6 | 0b | c7 | 16 | 62 | 28 | 44 |
| 20 | 92 | ca | 06 | d5 | 7c | a6 | cd | 14 | 39 | c0 | 5b | 46 | 32 | 9d | f8 |
| a6 | f8 | 58 | 9d | e2 | 55 | 26 | e8 | 03 | 97 | 0f | 8f | 5e | a9 | e9 | |

The bit dispersal of step 150 is then performed. Whether or not the original block was compressed, the bit substitution stage 150 has ensured that bit patterns look nothing like the original. The bit dispersion 160 obliterates any frequency-based patterns by taking various bits and moving them some distance from their current location.

The bit dispersal 160 utilizes a sample size P and a bit interval Q which have different values. For a P-sized portion of the input data segment 26 (after step 150), a P-sized portion if the input data segment 26 is obtained, and all bits of a P-sized holding area are set to a first value (e.g., 0). A sequence of bit locations in the holding area is determined based on the bit interval Q. Bits in the sequence of bit locations in the holding area are set to a second value (e.g., 1) that is different from the first value based on whether corresponding bits in the P-sized portion of the second stage input segment have the second value. In the example below, P and Q are different prime numbers.

In one example, the bit dispersion of step 150 is organized around any eight prime numbers in the range from 3 to 199. For example, 11, 29, 41, 47, 71, 73, 89, and 107 would be a usable subset. The prime numbers serve two roles: (a) a span of bytes across which bits are to be dispersed (P), and (b) an interval between successive bits (Q).

The second cryptographic key sequence can be thought of as a source from which successive draws of three bits will yield random values, each in the range 0 through 7. Recall that when N is set at six, there are 64 unique, randomly ordered six bit values in each key sequence. So 128 successive three bit draws are possible. Should all 128 be used, one cycles back to the start to continue drawing. The draws are mapped to the eight prime numbers, such that in the preceding example [11, 29, 41, 47, 71, 73, 89, and 107], a three bit draw of zero is mapped to the random number in position zero which is 11, a three bit draw of 1 is mapped to random number 1 which is 29, 2 to 41, 3 to 47, 4 to 71, 5 to 73, 6 to 89, and 7 to 107.

Note:
The set of prime numbers remains fixed for any one implementation. The complementary cryptographic modifications of encryption and decryption each use the same implementation.

The bit dispersal of step 160 would also work with sets of 16 prime numbers in the range 3 to 199 and draws of four bits at a time from the second key sequence.

The bit dispersal of step 160 would also work with sets of 32 prime numbers in the range 3 to 199 and draws of five bits at a time from the second key sequence.

In the example below (and the complementary step 350 in FIG. 4) the lowest eight eligible prime numbers in their natural order are used: 3, 5, 7, 11, 13, 17, 19, and 23.

The following steps are repeated until the entire input data segment 26 content has been processed.

Draw the next three bits from the second sequence in the key. (The drawing is simpler if the packed version of the sequence is used.) The value is in the range zero through seven. Values zero through 7 are mapped to counts 3, 5, 7, 11, 13, 17, 19, and 23 bytes. Let P be the corresponding prime number value, such that P represents the count of bytes to be replaced through dispersion of its bits.

Draw the next available three bits from the second sequence in the key. Values zero through seven are mapped to prime number counts 3, 5, 7, 11, 13, 17, 19, and 23. Let Q be that prime number. Q shall represent a "bit interval", that is, the new distance between formerly adjacent bits. For example, if Q=13, successive bits that were adjacent become usually 13 bits apart.

In one example, if the drawn numbers for P and Q are the same, they are discarded and further pairs are drawn as needed until the two values are different.

To continue with the German text example above, now compressed and reworked through the first iteration of bit substitution (step 150), the content in which bits are to be dispersed is shown in Table 5. The bytes from which bits are to be drawn is the second of the three sequences in Table 4. Very conveniently, in cases where bit basis N is six, a pair of three bit values may be drawn from each of the 64 values in the second sequence.

The first random number in that second sequence is 0x1d or bits 011101. P and Q are determined based on different subsets of those bits. In one example, the high order three bit value 011 (decimal 3) which map to prime number 11 are used for P, and the low order three bit value 101 (decimal 5) which map to prime number 17 are used for Q. Using these values, the bit dispersal of step 160 will disperse the bits in an eleven byte range so that adjacent bits wind up usually seventeen bits apart.

A P-sized holding area (in this example P=11, so 11 bytes) is created set to zero.

A sequence of bit locations in the holding area is determined based on the bit interval Q. The example below numbers all the bit positions in those eleven bytes from 0 to 87. In the example below, bit positions within a byte are numbered from right to left within each individual byte, that is, from the lowest value to the highest. Here is the numbering of bit positions within the eleven bytes. Read the index vertically, so that 1 above 0 is understood as 10 and 8 above 5 is understood as 85:

| Value: | ........ | ........ | ........ | ........ | ........ | ........ |
|---|---|---|---|---|---|---|
| | 00000000 | 11111100 | 22221111 | 33222222 | 33333333 | 44444444 |
| Index: | 76543210 | 54321098 | 32109876 | 10987654 | 98765432 | 76543210 |
| Value: | ........ | ........ | ........ | ........ | ........ | |
| | 55555544 | 66665555 | 77666666 | 77777777 | 88888888 | |
| Index: | 54321098 | 32109876 | 10987654 | 98765432 | 76543210 | |

This right-to-left numbering amounts to a legacy at this point since it has been built into the C and C++ computer languages. In an alternative embodiment, the bits are instead numbered from left to right.

With the setup in place, consider in turn one bit after another of the 88 bits in the first eleven bytes of Table 5—hexadecimal values 53 3e a2 ff fb 4e 37 0f 50 7c 51 above which correspond to bits:

| 01010011 | 00111110 | 10100010 | 11111111 | 11111011 | 01001110 |
|---|---|---|---|---|---|
| 00110111 | 00001111 | 01010000 | 01111100 | 01010001 | |

If a bit in this array is zero, do nothing. For every bit that is 1 in the incoming array of 88 bits, set a bit in the eleven byte replacement buffer. Regarding the bit position, the bit interval is 17. Therefore the first five bits will be set, when called for, in bit numbers 17, 34, 51, 68, 85. Where should the sixth bit be set? This is where the "usually" from a few paragraphs above is implicated.

In one example, modular arithmetic is used in adding bit intervals. In one such example, the rule is: Add the bit interval to the current position. If that is off the end of the replacement buffer, subtract the length in bits of the replacement buffer. What is next after 85? 85+17=102. 102−88=14. The next set of bits will go, when called for, to positions 14, 31, 48, 65, 82. What is next after 82? 82+17=99. 99−88=11. In other words, for a 11 byte (88 bit) input, replacement bit positions are (bit interval times 17) modulus 88.

Because we are dealing with prime numbers, the effect is that every bit is eligible to be set exactly once.

Consider in detail the first 24 bits of input. They are here given labels letters A through X in alphabetic order. Again, remember to go from right to left in each byte.

| 01010011 | 00111110 | 10100010 | 11111111 | 11111011 | 01001110 |
|----------|----------|----------|----------|----------|----------|
| HGFEDCBA | PONMLKJI | XWVUTSRQ |          |          |          |

Each bit that is set has an effect on a bit in the replacement. Here is the replacement again, with byte numbers and the letters that correspond to the first 24 bits above:

| Value: | ........ | ........ | ........ | ........ | ........ | ........ |
|---|---|---|---|---|---|---|
|  | 00000000 | 11111100 | 22221111 | 33222222 | 33333333 | 44444444 |
| Index: | 76543210 | 54321098 | 32109876 | 10987654 | 98765432 | 76543210 |
| Sequence: | U | F K P | V A | G L Q | W B | M R |
| Value: | ........ | ........ | ........ | ........ | ........ |  |
|  | 55555544 | 66665555 | 77666666 | 77777777 | 88888888 |  |
| Index: | 54321098 | 32109876 | 10987654 | 98765432 | 76543210 |  |
| Sequence: | C H | N S X | D I | O T | E J |  |

Recall that all bits in the replacement start turned off (0). Using these letters, here are the actions. We look first in the original to see if a bit is a '1', and if it is, set the equivalent bit in the replacement to 1.

Incoming A is a '1'; make replacement bit 17 a '1' (digit one).
Incoming B is a '1'; make replacement bit 34 a '1'.
Incoming C and D are off. Do nothing to bits 51 and 68.
Incoming E is a '1'; make replacement bit 85 a '1'.
Incoming F is off. Do nothing to bit 14.
Incoming G is a '1'; make replacement bit 31 a '1'.
Incoming H and I are off. Do nothing to bits 48 and 65.
Incoming J, K, L, M, and N are each 1. Set bits 82, 11, 28, 45, and 62.
Incoming O, P and Q are off. Do nothing to bits 79, 8 and 25.
Incoming R is a '1'; make replacement bit 42 a '1'.
Incoming S, T and U are off. Do nothing to bits 59, 76 and 5.
Incoming V is a '1'; make replacement bit 22 a '1'.
Incoming W is off. Do nothing to bit 39.
Incoming X is a '1'; make replacement bit 56 a '1'.

Here is the cumulative effect on the replacement of considering the first 24 bits:

These bit values are equivalent to hexadecimal c6 2c of f8 7e be 34 d7 c1 2a b4. These are the first eleven bytes in Table 6 below.

The second random number in the second sequence in Table 4 is 0x1e or bits 011110 where P happens to be again the "third" prime number 11, Q is the sixth prime number 19. These values of P and Q are used for a subsequent iteration of 11 bytes. The logic is repeated across the entire block, selecting new values for P and Q for each iteration. If blocks are large, multiple passes can be made through the 64 random numbers in the second cryptographic key sequence to more fully disperse the bits.

Near the end of a block, it may be necessary to process a non-prime number of bytes. That works, provided the byte count is not a multiple of the current bit count. In this case, the bit count could be changed to a default alternative prime number, for example.

Table 6 is the result of the bit dispersion stage on the German text example.

| Value: | 00000000 | 00001000 | 01000010 | 10010000 | 00000100 | 00100100 |
|---|---|---|---|---|---|---|
|  | 00000000 | 11111100 | 22221111 | 33222222 | 33333333 | 44444444 |
| Index: | 76543210 | 54321098 | 32109876 | 10987654 | 98765432 | 76543210 |
| Sequence: | U | F K P | V  A | G L Q | W  B | M R |
| Value: | 00000000 | 01000001 | 00000000 | 00000000 | 00100100 |  |
|  | 55555544 | 66665555 | 77666666 | 77777777 | 88888888 |  |
| Index: | 54321098 | 32109876 | 10987654 | 98765432 | 76543210 |  |
| Sequence: | C H | N S X | D I | O T | E J |  |

When all 88 bits are considered, the 11 byte replacement becomes:

| Value: | 11000110 | 00101100 | 11101111 | 11111000 | 01111110 | 10111110 |
|---|---|---|---|---|---|---|
|  | 00000000 | 11111100 | 22221111 | 33222222 | 33333333 | 44444444 |
| Index: | 76543210 | 54321098 | 32109876 | 10987654 | 98765432 | 76543210 |
| Sequence: | U | F K P | V  A | G L Q | W  B | M R |
| Value: | 00110100 | 11010111 | 11000001 | 00101010 | 10110100, |  |
|  | 55555544 | 66665555 | 77666666 | 77777777 | 88888888 |  |
| Index: | 54321098 | 32109876 | 10987654 | 98765432 | 76543210 |  |
| Sequence: | C H | N S X | D I | O T | E J |  |

TABLE 6

Sample after bit dispersion

| c6 | 2c | ef | f8 | 7e | be | 34 | d7 | c1 | 2a | b4 | ea | e8 | 68 | c0 | b7 |
|----|----|----|----|----|----|----|----|----|----|----|----|----|----|----|----|
| 92 | c4 | fe | 02 | e8 | c8 | 9b | ba | 10 | 40 | d1 | 9c | f1 | 43 | 06 | 55 |
| fb | e0 | 45 | 83 | fd | 6e | aa | 28 | d9 | c9 | 4d | 17 | 36 | c8 | 03 | 3b |
| 53 | ea | 29 | 10 | a5 | f0 | 00 | a6 | 23 | 09 | 3c | b7 | 03 | 37 | 13 | bd |
| f8 | ab | 2b | 89 | b9 | b3 | fb | 9e | 3b | b8 | 2b | 0a | a8 | ef | a9 | 4c |
| 55 | 7f | 0e | 46 | c3 | f7 | 18 | 29 | 86 | b8 | 81 | 8f | df | 0f | 23 | 80 |
| 79 | 85 | d6 | af | 82 | 5d | 32 | f8 | 5b | 24 | 88 | 6e | f8 | 7d | c6 | cd |
| 63 | c8 | ac | 29 | 7c | 7f | 44 | 84 | 81 | 41 | f1 | e6 | 48 | 44 | 50 | 86 |
| 88 | eb | cb | 71 | 00 | 27 | 73 | 3c | 02 | 81 | 09 | 1a | 77 | 6e | 5b | 13 |
| fe | 82 | dc | 83 | 34 | 65 | 7e | 8b | 15 | 2a | 5e | 16 | 8f | 9b | 77 |    |

The bit substitution of step 170 is then applied to the the input in Table 6 above. In one example, the process is same as the first bit substitution (step 150) except that a different cryptographic key sequence is used (i.e., the third cryptographic key sequence in Table 4). The result is the encrypted data segment 30 shown in Table 7.

TABLE 7

Result of second bit substitution

| 5b | 79 | cc | 64 | 94 | 19 | 34 | d2 | f6 | 73 | 10 | c2 | 42 | a7 | 68 | 92 |
|----|----|----|----|----|----|----|----|----|----|----|----|----|----|----|----|
| 9f | 63 | e6 | df | 61 | 1d | 18 | 10 | 8e | 3e | be | f1 | b3 | ba | db | f6 |
| ac | ba | 30 | 7a | e4 | 14 | 02 | 70 | df | 11 | 0f | e6 | 2b | 1e | 81 | 6c |
| 95 | 98 | 75 | 8d | c6 | 88 | a1 | c3 | dd | 18 | 31 | c4 | a2 | 76 | 03 | 30 |
| bd | f1 | 72 | ec | e9 | 7f | 98 | 14 | 02 | cb | 71 | 18 | 27 | 4c | 0a | 55 |
| 92 | 2c | 8a | 6a | 23 | 96 | 0f | 70 | f7 | ae | b4 | fe | 4b | e8 | 70 | 28 |
| 50 | f6 | 81 | c6 | e4 | 7b | 14 | c2 | b2 | 47 | 82 | a0 | 64 | 91 | 2a | 9c |
| 16 | f8 | c4 | 6f | e2 | 2d | 3d | 23 | b6 | 52 | 56 | a6 | 62 | a3 | 97 | 87 |
| b8 | 42 | 29 | 16 | a0 | 6e | e7 | 6e | 87 | 36 | 1b | ed | 44 | cb | f7 | c3 |
| e6 | 1f | 58 | b6 | 7f | bf | 2e | 17 | d2 | 73 | fb | 81 | 76 | 99 | 04 |    |

The user is presented with an option to wrap the file as text (step 180). This is useful for relatively small messages that one wishes to attach or spread as text in an email, in order to get past spam filters. In one example, the process of wrapping as text (step 190) replaces successive six bit segments of the encrypted file with mapped values {0 . . . 63}={A B . . . Y Z a b . . . y z 0 1 2 3 4 5 6 7 8 9. !}. This is a convenience only; the wrapped and binary versions are identical in their information content. In some examples, the wrapped version is 33% to 50% larger, depending on the addition of spaces, carriage returns, and line feeds.

This completes the example encryption process depicted in FIG. 2. As discussed above, FIG. 2 provides a non-limiting example of how to cryptographically modify a file. A number of variations would be possible, including repeating one or more of the steps 150-170 using different cryptographic key sequences, after step 170. Also, as discusses above, steps 110-140 and 180-190 are optional and may be omitted.

Turning attention back to the binary version of the encrypted data segment 30 in Table 7, note that whereas 80% of the original consisted of bytes repeated more than three times, there are in the encrypted version zero bytes repeated more than three times. There are also zero patterns that are four bytes or longer.

The sample here was brief. When the steps of FIG. 2 are applied to a larger file, the reduction in patterns is similar. Table 8 shows results of encryption using this invention on a 39 MB video file with extension WMV.

TABLE 8

Pattern reduction in a large file

|   | Before encryption | After encryption | Reduction |
|---|---|---|---|
| Size in bytes | 39,989,806 | 39,775,188 | 0.53% |
| 4 byte patterns . . . | | | |

TABLE 8-continued

Pattern reduction in a large file

|   | Before encryption | After encryption | Reduction |
|---|---|---|---|
| frequency >2 | 110,107 | 570 | 99.48% |
| frequency >3 | 21,873 | 2 | 99.99% |
| frequency >4 | 18,150 | 0 | 100.00% |

Some encryption systems add to the space required to store files as much as 20 to 30 percent. In contrast, the steps 150-170 in FIG. 1 in some examples do not add more than N+4 bytes (where N is the bit basis, a small integer). In many instances, the techniques discussed herein reduce file size and hence storage costs.

Encryption effectiveness increases to the extent that a file's byte distribution becomes more homogenous. There is no generally accepted definition or metric for randomness in a computer file, but as the frequencies of the 256 byte values converge, reduction in the standard deviation of their frequencies certainly indicates a greater randomness and loss of information that might otherwise provide clues to hackers.

Table 9 shows this encryption effect dramatically in the above mentioned 39 MB video file.

TABLE 9

Byte distribution in a large file

|  | Before encryption | After encryption | Reduction |
|---|---|---|---|
| Count of byte values | 256 | 256 | |
| Average frequency | 156,210 | 155,371 | |
| Median frequency | 151,052 | 155,377 | |
| Standard deviation | 50,050 | 432 | 99.14% |

Figure 3:
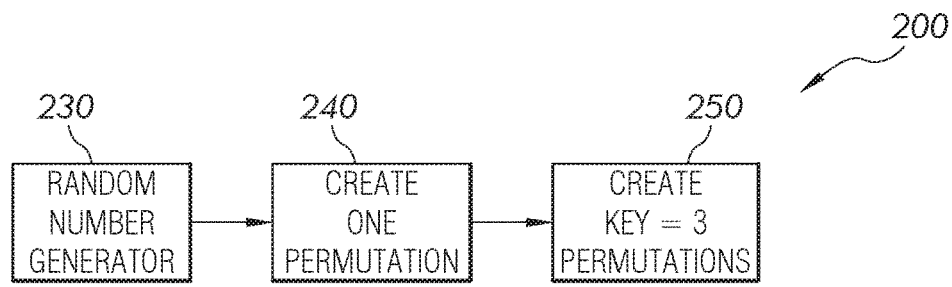
FIG. 3 is a flowchart of an example method of creating a cryptographic key.

FIG. 3 is a flowchart of an example method 200 of creating a cryptographic key having a plurality of cryptographic key sequences. In one example, the cryptographic key is a successive factorial key that that includes three discrete cryptographic key sequences, one for each stage described above (e.g., steps 150, 160, 170), with each sequence including a unique sequence of non-repeated integers, each integer having a value from 0 to $2^N-1$ where N is greater than 2. For a successive factorial key, there are $(2^N)!*(2^N)!(2^N)!$ different possible combinations of N-bit integers (i.e., three factorial sequences comprising each key). The cryptographic key sequences shown in Table 3 above collectively form a successive factorial key, for example. In one example, in addition to each cryptographic key sequence being unique from each other, no integer is located in the same position in more than one of the cryptographic key sequence of a successive factorial key.

Recall the earlier mention of a "bit basis" N=3 or higher. We will see that a bit basis of 6 provides encryption security amply resistant to all classical computers. It is also more than resistant to a quantum computer in the 300 qubit range, as envisioned by Jack Nicas in his article Welcome to the Quantum Age in Wall Street Journal's "The Future of Everything" magazine, November/December 2017. While 8 might seem a reasonable ceiling for bit bases, we should anticipate possibilities that quantum computing power may advance in decades ahead all the way up to 300 qubits and perhaps even well beyond. Therefore we do not limit the bit basis to 8. In one example, N is in the range 3-8. In a further example, N is in the range 3-24.

Quantum computing power doubles with each qubit added. Its exponential growth cannot begin to match the impact of adding a single bit to the bit basis of this invention. Table 10 illustrates the effect of keys built on each bit basis from 3 to 10. Notice the growth in encryption strength derived from successively higher bit bases.

TABLE 10

Alternative key strengths

| Bit basis | Capacity and range | Packed cryptographic key length | Count of permutations | Count of unique keys | Super speed brute force attack - time required |
|---|---|---|---|---|---|
| 3 | 8 (0-7) | 72 bits = 9 bytes | 8! = 40,320 | 8! cubed = 6.5548 * 10^13 | Under one second |
| 4 | 16 (0-15) | 192 bits = 24 bytes | 16! = 2.0923 * 10^13 | 16! cubed = 9.1595 * 10^39 | 2.9025 * 10^14 years |
| 5 | 32 (0-31) | 480 bits = 60 bytes | 32! = 2.6313 * 10^35 | 32! cubed = 1.8218 * 10^106 | 5.7729 * 10^80 years |
| 6 | 64 (0-63) | 1152 bits = 144 bytes | 64! = 1.2689 * 10^89 | 64! cubed = 2.0431 * 10^267 | 6.4742 * 10^241 years |
| 7 | 128 (0-127) | 2688 bits = 336 bytes | 128! = 3.8562 * 10^215 | 128! cubed = 5.7343 * 10^646 | 1.8171 * 10^621 years |
| 8 | 256 (0-255) | 6144 bits = 768 bytes | 256! = 8.5782 * 10^506 | 256! cubed = 6.3123 * 10^1520 | 2.0002 * 10^1495 years |
| 9 | 512 (0-511) | 13824 bits = 1728 bytes | 512! = 3.4773 * 10^1166 | 512! cubed = 4.2046 * 10^3499 | 1.3323 * 10^3474 years |
| 10 | 1024 (0-1023) | 30720 bits = 3840 bytes | 1024! = 5.4185 * 10^2639 | 1024! cubed = 1.5909 * 10^7919 | 5.0412 * 10^7893 years |

Some notes for Table 10: an exclamation mark means a factorial of a number, an asterisk (*) signifies multiplication, and a caret (^) signifies an exponent (i.e., "to the power"). Also, a packed key length = bit basis * capacity * 3 sequences, and a year has 365 1/4 days and 31,557,600 seconds. "Super speed" denotes 1 billion computers each trying 1 billion unique keys per second, that is, 3.1558 * 10^25 keys per year. A typical lifespan of a hacker is less than 10^2 years, and the lifespan of the universe is approximately 1.38 * 10^10 years.

Consider the eight digits 0 1 2 3 4 5 6 7. Note that each may be held in three bits—000 001 010 011 100 101 110 111. All eight of them could fit in 8 times 3=24 bits. 24 bits happens to be three bytes. A permutation of these eight digits is any sequence in any order of the eight digits in which each digit appears exactly once.

In the same way, permutations can be created for longer sequences of integers . . . four bit integers 0 through 15, five bit integers 0 through 31, six bit integers 0 through 63, seven bit integers 0 through 127, 8 bit integers 0 through 255, 9 bit integers 0 through 511, etc.

Factorial arithmetic comes into play if one is to count every possible unique permutation that can make up a sequence. In an eight digit sequence, the first digit may be selected in 8 ways (any one of 0 1 2 3 4 5 6 or 7). After the first digit is assigned, seven others remain. So the second digit may be selected in 7 ways. 6 digits remain. The third digit may be selected in 6 ways. Hence an entire sequence may be selected in 8 times 7 times 6 times 5 times 4 times 3 times 2 times 1 ways. The product of the integer 8 times all the integers below is called 8 factorial and is written 8!. The value turns out to be 40,320. In other words, there are 40,320 ways to arrange the digits 0 through 7 in a sequence.

In the same way, N! is the product N times N−1 times N−2 times . . . etc. . . . times 2 times 1. Factorials build quickly into large numbers. For example, 16! is 2.09 times ten to the power 13, while 32! is 2.63 times ten to the power 35. See the column "Count of permutations" in Table 10.

Referring to FIG. 3, a random number generator is initiated (step 230). In one example, the random number generator does not build bias into its output of random numbers, because bias may cause certain values to be produced disproportionately; that in turn would reduce the number of unique segments to be built into cryptographic keys. A hacker would find it convenient to have to test for only (say) 15,000 instead of 40,320 sequences.

Assuming N=3, the random number generator is used to create a single permutation 240 of digits 0 through 7 to serve within a key, the task is to extract numbers from the output of a random number generator. The method used should not itself introduce bias. One method might be to take the latest 3 bits emerging from random number generation, inspect whether that number has been used in the sequence so far, and (if not already in the current sequence) use it as the next value in sequence, or alternatively discard it and go on to the next three bits from the generator.

Taking successively more bits (4 and progressively upward to 24) could be performed to develop a permutation for stronger bit bases.

Three permutations are selected as the first, second, and third cryptographic key sequences and collectively form a cryptographic key (step 250).

A sequence of 8 three bit values may be held in 24 bits or 3 bytes, and a corresponding triple sequence may be held in 72 bits or 9 bytes. Each sequence may be chosen in 8! (40,320) ways. That's worth emphasizing: The first sequence, the second sequence, and the third sequence may each be independently selected in 40,320 ways. The number of unique keys is therefore 40,320 times 40,320 times 40,320=6.558 times 10 to the 13th power. Recall that 8 is 2 cubed. So eight factorial cubed may be written as ((2^3)!)^3.

The fifth column of Table 10 carries the label "Count of unique keys". In the example of Table 10, for each bit basis, a count of unique keys is a cube of the factorial. Note how the count becomes staggeringly large as one proceeds down through Table 10.

Different key strengths may be appropriate for different applications. For a consumer product in which the value of the data is minimal compared to the cost of mounting a heavy duty brute force attack, even a bit basis as small as 3 might be worthwhile. Key lengths for bit bases 7 and 8 may be stronger than needed for current computers, but these bit bases or larger ones could of course be used. Basis 4 is likely adequate for corporate needs and is fast since it involves less bit shifting than some of the other bases. Basis 6 may have more appeal for military, diplomatic, and government applications, at least until quantum computing moves beyond its neonatal state.

FIG. 4 is a flowchart of an example method of decrypting an input data segment (e.g., the encrypted data segment 30). The encryption method 100 and the decryption method 300 are complementary cryptographic modifications. In one example, in FIG. 1 the encryption engine 24 of computing device 22A performs the encryption method 100 for the data segment 26 to obtain the encrypted data segment 30, and the encryption engine 24 of the computing device 22B performs the decryption method 300 on the encrypted data segment 30 to obtain the data segment 26.

The steps of the method 300 are almost a mirror image of those of the encryption method 100 and make use of much of the same logic. The same German text example is used to illustrate the process.

A determination is made of whether the encrypted data segment 30 is text wrapped (step 310). In one example, this can be performed by sampling a byte distribution in the encrypted file. If it consists entirely of alphanumeric characters, spaces, and line ends, then the encryption engine 24 determines that the encrypted data segment 30 is text wrapped and removes the text wrapping (step 320) by reversing the earlier mapping . . . e.g., A becomes bits 000000, B becomes 000001, etc. through to period 111110 and exclamation mark 111111. Each four bytes of input become 3 binary bytes in the process, so it may be carried out in situ (within the same block buffer) in some examples.

The first and third cryptographic key sequences are modified or "inverted" for decryption for undoing the bit substitutions of steps 150, 170. They are also switched so that the third cryptographic key sequence is used for the first bit substitution during decryption (step 340) and the first cryptographic key sequence to be used for the second bit substitution during decryption (step 360). The second sequence of the key may be used exactly as it is in the method 100.

To perform the "inversion" of each cryptographic key sequence, an index Y of positions in each key sequence is determined, and a value Z of each integer is determined. A holding area that is the same size as the cryptographic key sequence is set to zero. For each Yth index value having a value of Z, the Zth value in the holding area is set to the position value of Y. An example is discussed in connection with Table 11 below.

Table 11 shows how the first cryptographic key sequence from Table 4 is inverted. The method is detailed below the table.

TABLE 11

| Key's first sequence inverted to hex positions | | | | | | | | | | | | | | | | |
|---|---|---|---|---|---|---|---|---|---|---|---|---|---|---|---|---|
| Incoming first cryptographic key sequence (pre-inversion): | | | | | | | | | | | | | | | | |
| Value: | 3d | 15 | 3e | 07 | 2d | 20 | 13 | 19 | 03 | 33 | 0e | 06 | 00 | 22 | 11 | 12 |
| Position: | 00 | 01 | 02 | 03 | 04 | 05 | 06 | 07 | 08 | 09 | 0a | 0b | 0c | 0d | 0e | 0f |
| Value: | 10 | 1f | 36 | 02 | 01 | 25 | 0f | 05 | 17 | 29 | 1c | 0a | 18 | 2a | 14 | 24 |
| Position: | 10 | 11 | 12 | 13 | 14 | 15 | 16 | 17 | 18 | 19 | 1a | 1b | 1c | 1d | 1e | 1f |
| Value: | 2e | 35 | 0c | 3f | 30 | 27 | 3b | 1e | 2f | 37 | 1a | 34 | 23 | 39 | 2c | 04 |
| Position: | 20 | 21 | 22 | 23 | 24 | 25 | 26 | 27 | 28 | 29 | 2a | 2b | 2c | 2d | 2e | 2f |
| Value: | 0d | 3a | 3c | 21 | 09 | 0b | 1b | 26 | 08 | 1d | 2b | 16 | 32 | 38 | 28 | 31 |
| Position: | 30 | 31 | 32 | 33 | 34 | 35 | 36 | 37 | 38 | 39 | 3a | 3b | 3c | 3d | 3e | 3f |

TABLE 11-continued

Key's first sequence inverted to hex positions

First cryptographic key sequence after inversion:

| Value: | 0c | 14 | 13 | 08 | 2f | 17 | 0b | 03 | 38 | 34 | 1b | 35 | 22 | 30 | 0a | 16 |
|---|---|---|---|---|---|---|---|---|---|---|---|---|---|---|---|---|
| Position: | 00 | 01 | 02 | 03 | 04 | 05 | 06 | 07 | 08 | 09 | 0a | 0b | 0c | 0d | 0e | 0f |
| Value: | 10 | 0e | 0f | 06 | 1e | 01 | 3b | 18 | 1c | 07 | 2a | 36 | 1a | 39 | 27 | 11 |
| Position: | 10 | 11 | 12 | 13 | 14 | 15 | 16 | 17 | 18 | 19 | 1a | 1b | 1c | 1d | 1e | 1f |
| Value: | 05 | 33 | 0d | 2c | 1f | 15 | 37 | 25 | 3e | 19 | 1d | 3a | 2e | 04 | 20 | 28 |
| Position: | 20 | 21 | 22 | 23 | 24 | 25 | 26 | 27 | 28 | 29 | 2a | 2b | 2c | 2d | 2e | 2f |
| Value: | 24 | 3f | 3c | 09 | 2b | 21 | 12 | 29 | 3d | 2d | 31 | 26 | 32 | 00 | 02 | 23 |
| Position: | 30 | 31 | 32 | 33 | 34 | 35 | 36 | 37 | 38 | 39 | 3a | 3b | 3c | 3d | 3e | 3f |

64 bytes are set aside to receive replacement values. Visualize the replacement values starting with all zeroes. Then follow through the incoming sequence at the top (3d, 15, 3e, 07, etc.), and:

Replace the value in position 3d of the holding area with its position index value of 00
Replace the value in position 15 of the holding area with its position index value of 01
Replace the value in position 3e of the holding area with its position index value of 02
Replace the value in position 07 of the holding area with its position index value of 03
Replace the value in position 28 of the holding area with its position index value of 3e
Replace the value in position 31 of the holding area with its position index value of 3f.

Table 12 shows the three keys with the first inverted as above and the third "inverted" using the same logic.

TABLE 12

Decryption key with first and third sequence inverted

| 0c | 14 | 13 | 08 | 2f | 17 | 0b | 03 | 38 | 34 | 1b | 35 | 22 | 30 | 0a | 16 |
|---|---|---|---|---|---|---|---|---|---|---|---|---|---|---|---|
| 10 | 0e | 0f | 06 | 1e | 01 | 3b | 18 | 1c | 07 | 2a | 36 | 1a | 39 | 27 | 11 |
| 05 | 33 | 0d | 2c | 1f | 15 | 37 | 25 | 3e | 19 | 1d | 3a | 2e | 04 | 20 | 28 |
| 24 | 3f | 3c | 09 | 2b | 21 | 12 | 29 | 3d | 2d | 31 | 26 | 32 | 00 | 02 | 23 |
| 1d | 1e | 2c | 26 | 3e | 3d | 12 | 38 | 02 | 0c | 17 | 19 | 0a | 1b | 3a | 0f |
| 2b | 0e | 2f | 3b | 1c | 1f | 33 | 00 | 01 | 14 | 25 | 28 | 0d | 32 | 22 | 07 |
| 15 | 05 | 2d | 3f | 10 | 08 | 23 | 27 | 1a | 03 | 36 | 16 | 04 | 35 | 30 | 11 |
| 31 | 24 | 39 | 09 | 06 | 20 | 18 | 13 | 37 | 29 | 34 | 0b | 2e | 3c | 2a | 21 |
| 0e | 16 | 2a | 13 | 37 | 0c | 02 | 32 | 30 | 07 | 21 | 1f | 2f | 0d | 05 | 18 |
| 3a | 09 | 15 | 34 | 1e | 3d | 31 | 35 | 1c | 3e | 17 | 0f | 0a | 23 | 1a | 2c |
| 2e | 28 | 3c | 04 | 2d | 14 | 24 | 33 | 00 | 39 | 06 | 36 | 3b | 20 | 38 | 10 |
| 19 | 2b | 1b | 26 | 12 | 29 | 01 | 22 | 08 | 3f | 03 | 1d | 27 | 0b | 11 | 25 |

The first and third cryptographic key sequences having been inverted, the additional decryption steps will now be discussed.

The third cryptographic key sequence in the key is used in a first bit substitution (step 340), with the same logic as described in connection with step 150 above (for each N-bit integer having a respective value X, replace the N-bit integer with an Xth N-bit integer in the cryptographic key sequence). In this regard, bit patterns are substituted. This inverted third sequence is applied to the encrypted file which is shown in Table 7 above. The result is the array shown in Table 6.

The second (unchanged) cryptographic key sequence in the key is then used in a to recoup bits (step 350), in effect calling bits back from the positions to which they were dispersed in step 160. The second sequence within the key is unchanged, and it guides the process as before, to work with buffers with lengths that are prime numbers. The first number in that sequence, as before, is 0x1d or bits 011101 (three bit values 011=3 and 101=5). P is the "third" prime number 11, the length of the first batch to be replaced. Bit interval Q is the "fifth" prime number 17. As before, we create and set to zero an eleven byte holding area. Number all the bit positions, exactly as before from 0 to 87.

Everything is the same as in step 160 up to this point. But the bit by bit handling is reversed this time.

Here again is the lead-up to Table 6. The difference is that this is no longer the replacement, but instead the incoming 88 bits=11 bytes. In the example below, bit positions within a byte are numbered from right to left within each individual byte, that is, from the lowest value to the highest. Read the index vertically, so that 1 above 0 is understood as 10 and 8 above 5 is understood as 85:

| Value: | 11000110 | 00101100 | 11101111 | 11111000 | 01111110 | 10111110 |
|---|---|---|---|---|---|---|
|  | 00000000 | 11111100 | 22221111 | 33222222 | 33333333 | 44444444 |
| Index: | 76543210 | 54321098 | 32109876 | 10987654 | 98765432 | 76543210 |
| Sequence: | U | F K P | V | A G L Q | W B | M R |
| Value: | 00110100 | 11010111 | 11000001 | 00101010 | 10110100, |  |
|  | 55555544 | 66665555 | 77666666 | 77777777 | 88888888 |  |
| Index: | 54321098 | 32109876 | 10987654 | 98765432 | 76543210 |  |
| Sequence: | C H | N S X | D I | O T | E J |  |

The bit above are equivalent to the first eleven bytes of Table 6, that is, c6 2c ef f8 7e be 34 d7 c1 2a b4.

Create two pointers, ptInput and ptReplace, to positions in the above input and in the replacement. Set both to zero. Then repeat these steps 88 times, once for each bit:
1. Add the Q bit interval value (17) to ptInput.
2. If ptInput is greater that 87, subtract 88. [Modulus arithmetic]
3. Is the bit in position ptInput is set? If yes, set bit ptReplace in the replacement.
4. Increment ptReplace.

The first 24 bit positions have labels A through X, exactly as before. Proceed through A to X:
Incoming bit 17 (A) is a '1'; make bit 0 (A) in the replacement a '1'.
Incoming bit 34 (B) is a '1'; make bit 1 (B) in the replacement a '1'.
Incoming bits 51 and 68 (C and D) are off; do nothing to bits 2 and 3.
Incoming bit 85 (E) is a '1'; make bit 4 (E) in the replacement a '1'.
Incoming bit 14 (F) is off; do nothing to bit 5 in the replacement.
Incoming bit 31 (G) is a '1'; make bit 6 (G) in the replacement a '1'.
Incoming bits 48 and 65 (H and I) are off; do nothing to bits 7 and 8.
Incoming bits 82, 11, 28, 45, and 62 (J, K, L, M, and N) are all '1'; set all of bits 9, 10, 11, 12, and 13 (J, K, L, M, and N) in the replacement.
Incoming bits 79, 8 and 25 (O, P and Q) are off; do nothing to bits 14-16.
Incoming bit 42 (R) is a '1'; make bit 17 (R) in the replacement a '1'.
Incoming bits 59, 76 and 5 (S, T and U) are off; do nothing to bits 18-20.
Incoming bit 22 (V) is a '1'; make bit 21 (V) in the replacement a '1'.
Incoming bit 39 (W) is off; do nothing to bit 22.
Incoming bit 56 (X) is a '1'; make bit 23 (X) in the replacement a '1'.

The result of the above operations on the first 24 bits is to create this replacement:

| 01010011 | 00111110 | 10100010 |
|---|---|---|
| HGFEDCBA | PONMLKJI | XWVUTSRQ |

Repeat through all 88 bits. The 11 byte replacement becomes hexadecimal
53 3e a2 ff fb 4e 37 0f 50 7c 51
which exactly corresponds to the first 11 bytes in Table 5. Overwrite the first 11 bytes by copying the replacement into their place.

Proceed to the next byte in the second sequence, use it to determine the next replacement length in bytes (P) and the next bit interval (Q). Repeat the same logic to recoup the replacement bits. Repeat through the entire block. The result is shown in Table 5.

The next step in decryption is to perform the second bit substitution (step 360), this time using the inverted first cryptographic key sequence from table 11. The logic is as before. The result is shown in Table 2.

If the encrypted data segment 30 includes a date/time stamp, the date/time stamp is trimmed (step 370). Since the current file length is 159, a multiple of 3, no null bytes were originally appended and hence no bytes need to be dropped now. That leaves a date/time stamp (4 bytes 0x96 0x61 0xd9 0x59) preceded by a signal byte 0x40. The latter is an example code that serves as a flag to indicate that a file that has been compressed (see step 380). The date/time stamp can be removed (e.g., by removing the date/time stamp and signal byte discussed above). At this point any desired actions that are appropriate to the implementation may be taken (for example, warning that the sender is no longer on the roster).

In cases where the signal for compression 380 is set, the compressed data segment 26 is decompressed (step 390), e.g., using the zlib library. The result in the case of the sample is the text in Table 1. In the case of the WMV video in connection with tables 8 and 9, the result of decryption is the original 39,989,806 byte WMV file, byte by byte identical to the original.

This completes the logic for decryption of a file or message according to the example of FIG. 4.

FIG. 5 schematically illustrates an example computing device 400 that may be utilized as either of the computing devices 22A-B in FIG. 1, and may be configured to perform one or more of the methods 100, 200, 300. The computing device 400 includes a processor 402 that is operatively connected to memory 404 and a communication interface 406.

The processor 402 includes processing circuitry to carry out steps of the method 100, 200, and/or 300. The processor 402 may include one or more microprocessors, microcontrollers, application specific integrated circuits (ASICs), or the like, for example.

The memory 404 can include any one or combination of volatile memory elements (e.g., random access memory (RAM, such as DRAM, SRAM, SDRAM, VRAM, etc.)) and/or nonvolatile memory elements (e.g., ROM, hard drive, tape, CD-ROM, etc.). Moreover, the memory 404 may incorporate electronic, magnetic, optical, and/or other types of storage media. The memory 404 can also have a distributed architecture, where various components are situated remotely from one another, but can be accessed by the processor 402. The memory may store key repository 28A and/or 28B, for example.

The communication interface 406 is operable to communicate with other computing devices, and may include a wired or wireless networking transceiver, for example, for communicating via the wide area network 34.

By using the techniques discussed above, the probability of a hacker correctly performing a brute force decryption approaches zero. For example, for a key basis of N=6, that probability is one chance in ten raised to the power 267. The techniques discussed above considerably remove patterns from the input data segment 26, in some examples causing the encrypted data segment 30 to be devoid of any meaningful patterns at all. The lack of patterns reduces suggestive clues for hackers, and figuratively blindfolds hackers.

Even if a hacker were to penetrate the first stage of logic (e.g., one of the bit substitutions), the work in process would still be without patterns, with the result that the hacker would find no confirmation of a correct key sequence. The hacker is thus presented with computational infeasibility for both classical and quantum computers alike.

Thus, the encrypted data segment 30 can be created to be impervious to pattern recognition and brute force attacks, providing enhanced privacy for content owners and frustration for hackers. Even if a hacker knows how the methods 100, 200, and 300 are performed and has sophisticated computing resources at his or her disposal for detecting patterns in digital data, the hacker would be thwarted by the lack of patterns in the encrypted data segment 30. A hacker inclined to attempt a brute force attack could take many, many millions of years to yield any fruitful results.

The methods 100, 300 can be performed quickly, and can be performed in such a fashion as to add only a minimal size to the input data segment (in some examples never more than N+4 bytes longer than plain text). The methods 100, 300 tend to be faster and more efficient than prior art encryption methods.

In some examples, the methods 100, 300 can be performed to enhance existing cryptographic systems, so that they might meet stringent legal privacy by design requirements such as those established by the European Union's General Data Protection Regulation (GDPR).

Although example embodiments have been disclosed, a worker of ordinary skill in this art would recognize that certain modifications would come within the scope of this disclosure. For that reason, the following claims should be studied to determine the scope and content of this disclosure.

Referring now to the drawings wherein the showings are for purposes of illustrating a preferred embodiment of the invention only and not for purposes of limiting the same, FIGS. 1 through 3 show the present invention.

What is claimed is:

1. A method of cryptographically modifying an input data segment, comprising:
    performing, in a first stage, a first bit substitution operation based on a first stage input segment and a first cryptographic key sequence;
    performing, in a subsequent second stage, a bit dispersal based on a second stage input segment and a second cryptographic key sequence; and
    performing, in subsequent a third stage, a second bit substitution operation based on a third stage input segment and a third cryptographic key sequence;
    wherein the first, second, and third stage input segments are all derived from the input data segment;
    wherein said performing a bit dispersal comprises, for a P-sized portion of the second stage input segment:
        setting all bits of a P-sized holding area to a first value;
        determining a sequence of bit locations in the holding area based on a bit interval Q, where Q and P have different positive integer values; and
        setting bits in the sequence of bit locations in the holding area to a second value that is different from the first value based on whether corresponding bits in the P-sized portion of the second stage input segment have the second value;
    wherein the bit dispersal is iteratively repeated for subsequent portions of the second stage input segment, and in each iteration, new values for P and Q are determined based on other portions of the second cryptographic key sequence; and
    wherein the input data segment is part of a file or data stream, and the method is performed to produce a cryptographically modified file or data stream.

2. The method of claim 1, wherein the first stage input segment is the input data segment, the second stage input segment is based on an output of the first stage, and the third stage input segment is based on an output of the second stage.

3. The method of claim 2, comprising:
    in a complementary cryptographic modification, repeating the first, second, and third stages using a modified version of the third cryptographic key sequence in the first stage, and using a modified version of the first cryptographic key sequence in the third stage.

4. The method of claim 1, wherein each cryptographic key sequence comprises a plurality of integers arranged in a unique sequence and having values from 0 to $2^{N-1}$, where N is greater than 2.

5. The method of claim 4, wherein N is less than or equal to 24.

6. The method of claim 4, wherein the integers in each cryptographic key sequence are N-bit integers, and within each of the cryptographic key sequences no N-bit integer is repeated.

7. The method of claim 6, wherein the first, second, and third cryptographic sequences collectively form a cryptographic key for which there are $(2^N)!*(2^N)!*(2^N)!$ different possible combinations of N-bit integers.

8. The method of claim 1, comprising:
    compressing the input data segment and performing said first bit substitution based on the compressed input data segment if the compressing achieves a size reduction that exceeds a threshold amount.

9. The method of claim 1, wherein said performing a first bit substitution operation comprises:
    dividing the first stage input segment into a plurality of N-bit integers; and
    for each N-bit integer having a respective positive integer value X, replacing the N-bit integer with an Xth N-bit integer in the first cryptographic key sequence.

10. The method of claim 9, wherein said performing the first bit substitution comprises:
    obtaining the first stage input segment and first cryptographic sequence as respective sequences of M-bit integers; and
    segmenting each of the respective sequences of M-bit integers into respective sequences of N-bit integers for the first bit substitution, where M is a first multiple of 8 that is greater than or equal to N.

11. The method of claim 9, wherein said performing a third bit substitution operation comprises:
    dividing the third stage input segment into a plurality of N-bit integers; and
    for each N-bit integer in the third stage input segment having a respective positive integer value X, replacing the N-bit integer with an Xth N-bit integer in the third cryptographic key sequence.

12. The method of claim 11, wherein said performing the third bit substitution comprises:
    obtaining the third stage input segment and third cryptographic sequence as respective sequences of M-bit integers; and
    segmenting each of the respective sequences of M-bit integers into respective sequences of N-bit integers for the second bit substitution, where M is a first multiple of 8 that is greater than or equal to N.

13. The method of claim 1, wherein P and Q are both prime numbers.

14. The method of claim 1, wherein said performing a bit dispersal comprises:
    determining a multi-bit integer X based on the second cryptographic key sequence;
    determining a value for Q based on a first subset of bits of X; and
    determining a value for P based on a different second subset of the bits of X.

15. The method of claim 1, wherein said determining a sequence of bit locations in the holding area based on a bit interval Q comprises:

determining an address index value for each of the bits in the P-sized portion of the second stage input segment; and incrementing the address index value by at least Q between consecutive bit locations in the sequence, including returning to a beginning of the address index upon reaching an end of the address index.

16. The method of claim 1, wherein to obtain the modified version of the file or data stream, the method is repeated to perform the cryptographic modification for a plurality of additional input data segments from the file or data stream.

17. A computing device comprising:
memory storing first, second, and third cryptographic key sequences that are different from each other, and an input data segment; and
a processor operatively connected to the memory and configured to, as part of a cryptographic modification of the input data segment:
perform, in a first stage, a first bit substitution operation based on a first stage input segment and a first cryptographic key sequence;
perform, in a subsequent second stage, a bit dispersal based on a second stage input segment and a second cryptographic key sequence; and
perform, in a subsequent third stage, a second bit substitution operation based on a third stage input segment and a third cryptographic key sequence;
wherein the first, second, and third stage input segments are all derived from the input data segment;
wherein to perform the bit dispersal, the processor is configured to, for a P-sized portion of the second stage input segment:
set all bits of a P-sized holding area to a first value;
determine a sequence of bit locations in the holding area based on a bit interval Q, where Q and P have different positive integer values; and
set bits in the sequence of bit locations in the holding area to a second value that is different from the first value based on whether corresponding bits in the P-sized portion of the second stage input segment have the second value;
wherein the processor is configured to iteratively repeat the bit dispersal for subsequent portions of the second stage input segment, and in each iteration, to determine new values for P and Q based on other portions of the second cryptographic key sequence; and
wherein the input data segment is part of a file or data stream, and the processor is configured to perform the method to produce a cryptographically modified version of the file or data stream.

18. The computing device of claim 17, wherein the first stage input segment is the input data segment, the second stage input segment is based on an output of the first stage, and the third stage input segment is based on an output of the second stage.

19. The computing device of claim 18, comprising:
in a complementary cryptographic modification, repeating the first, second, and third stages using a modified version of the third cryptographic key sequence in the first stage, and using a modified version of the first cryptographic key sequence in the third stage.

20. The computing device of claim 17, wherein each cryptographic key sequence comprises a plurality of integers arranged in a unique sequence and having values from 0 to $2^{N-1}$, where N is greater than 2.

21. The computing device of claim 20, wherein N is less than or equal to 24.

22. The computing device of claim 20, wherein the integers in each cryptographic key sequence are N-bit integers, and within each of the cryptographic key sequences no N-bit integer is repeated.

23. The computing device of claim 22, wherein the first, second, and third cryptographic sequences collectively form a cryptographic key for which there are $(2^N)!*(2^N)!*(2^N)!$ different possible combinations of N-bit integers.

24. The computing device of claim 17, wherein the processor is configured to: compress the input data segment and perform said first bit substitution based on the compressed input data segment if the compressing achieves a size reduction that exceeds a threshold amount.

25. The computing device of claim 17, wherein as part of the first bit substitution, the processor is configured to:
divide the first stage input segment into a plurality of N-bit integers; and
for each N-bit integer having a respective positive integer value X, replace the N-bit integer with an Xth N-bit integer in the first cryptographic key sequence.

26. The computing device of claim 25, wherein as part of the first bit substitution, the processor is configured to:
obtain the first stage input segment and first cryptographic sequence as respective sequences of M-bit integers; and
segment each of the respective sequences of M-bit integers into respective sequences of N-bit integers for the first bit substitution, where M is a first multiple of 8 that is greater than or equal to N.

27. The computing device of claim 25, wherein as part of the third bit substitution operation, the processor is configured to:
divide the third stage input segment into a plurality of N-bit integers; and
for each N-bit integer in the third stage input segment having a respective positive integer value X, replace the N-bit integer with Xth N-bit integer in the third cryptographic key sequence.

28. The computing device of claim 26, wherein as part of the second bit substitution operation, the processor is configured to:
obtain the third stage input segment and third cryptographic sequence as respective sequences of M-bit integers; and
segment each of the respective sequences of M-bit integers into respective sequences of N-bit integers for the first bit substitution, where M is a first multiple of 8 that is greater than or equal to N.

29. The computing device of claim 17, wherein P and Q are both prime numbers.

30. The computing device of claim 17, wherein as part of the bit dispersal, the processor is configured to:
determine a multi-bit integer X based on the second cryptographic key sequence;
determine a value for Q based on a first subset of bits of X; and
determine a value for P based on a different second subset of the bits of X.

31. The computing device of claim 17, wherein to determine the sequence of bit locations in the holding area based on a bit interval Q, the processor is configured to:
determine an address index value for each of the bits in the P-sized portion of the second stage input segment; and
increment the address index value by at least Q between consecutive bit locations in the sequence, including returning to a beginning of the address index upon reaching an end of the address index.

32. The computing device of claim 17, wherein to obtain the modified version of the file or data stream, the processor is configured to repeat the cryptographic modification for a plurality of additional input data segments from the file or data stream.

33. A method of cryptographically modifying an input data segment, comprising:

performing, in a first stage, a first bit substitution operation that substitutes bits of a first stage input segment with bits from a first cryptographic key sequence, the first bit substitution operation comprising:

dividing the first stage input segment into a plurality of N-bit integer values; and for each N-bit integer value being a respective positive integer value X, replacing the N-bit integer value with an Xth N-bit integer value in the first cryptographic key sequence; and performing, in a second stage that precedes or follows the first stage, a bit dispersal based on a second stage input segment and a second cryptographic key sequence;

wherein the first and second stage input segments are all derived from the input data segment; and wherein the input data segment is part of a file or data stream, and the method is performed to produce a cryptographically modified version of the file or data stream.

34. The method of claim 33, wherein said performing the first bit substitution comprises:

obtaining the first stage input segment and first cryptographic sequence as respective sequences of M-bit integers; and segmenting each of the respective sequences of M-bit integers into respective sequences of the N-bit integer values for the first bit substitution, where M is a first multiple of 8 that is greater than or equal to N.

35. The method of claim 33, wherein said performing a third bit substitution operation comprises:

dividing the third stage input segment into a plurality of additional N-bit integer values; and for each additional N-bit integer value in the third stage input segment being a respective positive integer value X, replacing the N-bit integer value with an Xth N-bit integer value in the third cryptographic key sequence.

36. The method of claim 33, wherein the integers in each cryptographic key sequence are N-bit integers, and within each of the cryptographic key sequences no N-bit integer is repeated.

\* \* \* \* \*